United States Patent [19]

Lindler

[11] Patent Number: 5,066,260
[45] Date of Patent: Nov. 19, 1991

[54] WILD TURKEY CALLER

[76] Inventor: J. Monroe Lindler, 180 W. Hwy. 378, Lexington, S.C. 29072

[21] Appl. No.: 160,816

[22] Filed: Feb. 26, 1988

[51] Int. Cl.[5] ............................................. A63H 5/00
[52] U.S. Cl. .................................... 446/397; 446/421
[58] Field of Search ............... 446/188, 192, 193, 203, 446/397, 418, 419, 420, 421, 422, 417, 415

[56] References Cited

U.S. PATENT DOCUMENTS

| 186,169 | 1/1877 | Rowbotham | 446/415 |
| 651,752 | 6/1900 | Draughon | 446/397 |
| 2,629,968 | 3/1953 | Herter | 446/418 |
| 2,958,157 | 11/1960 | Tannehill | 446/397 |
| 3,129,527 | 4/1964 | Williams | 446/397 X |
| 3,208,184 | 9/1965 | Wisor | 446/397 |
| 3,367,064 | 2/1968 | Anthony et al. | 446/397 |
| 4,310,986 | 1/1982 | Jacobs | 446/397 |
| 4,648,852 | 3/1987 | Wingate | 446/397 |

*Primary Examiner*—Robert A. Hafer
*Assistant Examiner*—Sam Rimell
*Attorney, Agent, or Firm*—Renner, Kenner, Greive, Bobak, Taylor & Weber

[57] ABSTRACT

A substantially rectangular game caller having wood top end and side walls (10), (11), (12) and (13) forming a resonator chamber R, a bottom vibrator plate (15) of graphite-epoxy laminate enclosing said chamber, a friction edging strip (18) secured to a side edge of said plate (15) and a slot (17) above the edging strip to allow free vibration of the vibrator plate (15).

4 Claims, 1 Drawing Sheet

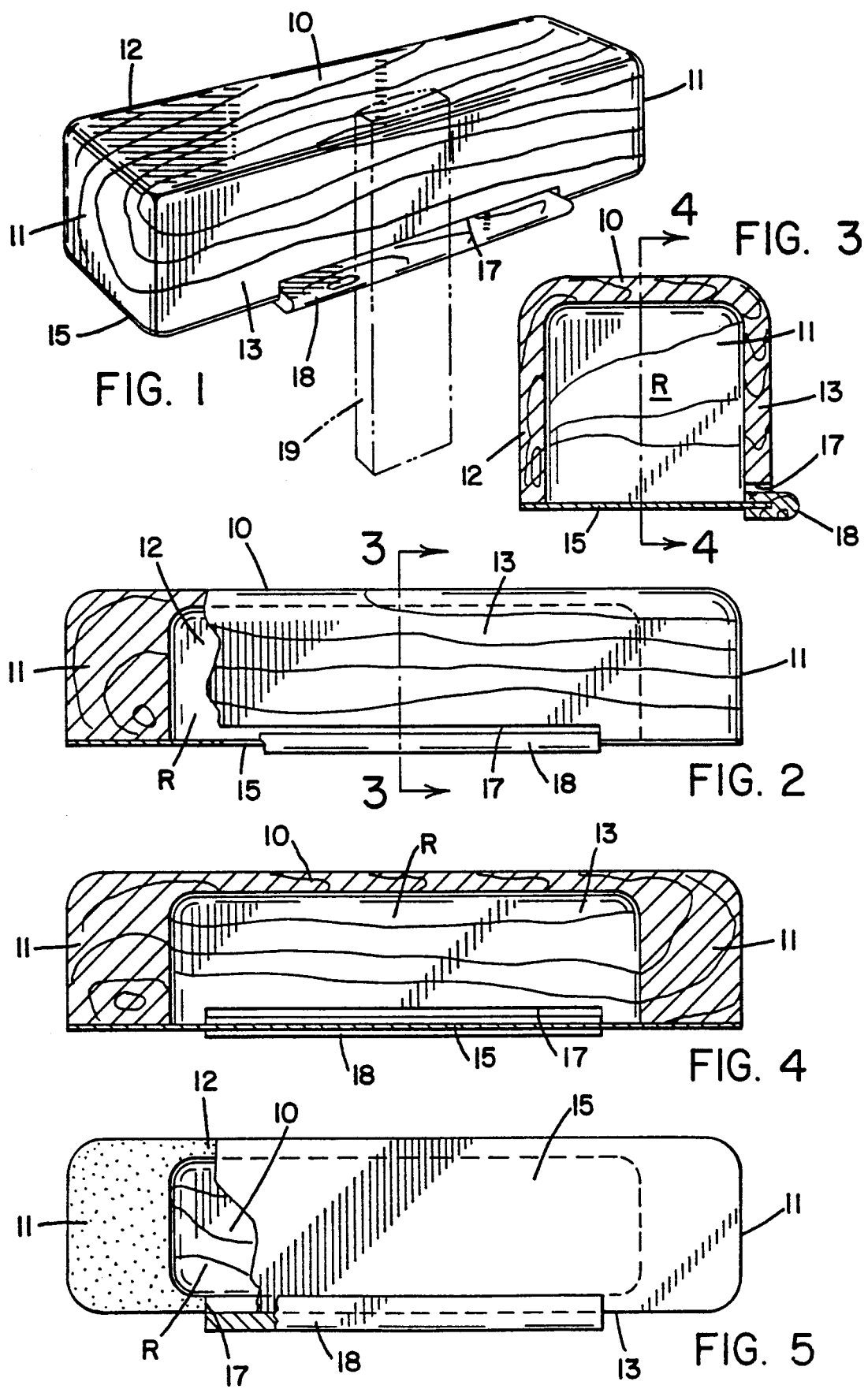

WILD TURKEY CALLER

TECHNICAL FIELD

This invention relates to devices used by hunters to simulate the calls of game birds, and more particularly the call of the wild turkey.

BACKGROUND OF THE INVENTION

Traditionally, turkey callers have consisted of a sound box or resonator having a vibrator element or sounding board, the sound box being adapted to amplify the vibrations to produce a sound simulating the call of the wild turkey. Prior turkey callers of which I am aware have been made entirely of wood, and a variety of woods such as cedar, mahogany, maple and walnut have been used. The vibrator element has been a relatively thin piece or plate of wood forming a wall of the sound box. The dimensions of the sound box and vibrator must be such as to produce a sound of the proper pitch and tone when the vibrations of the vibrator element are amplified.

Obviously, wood vibrator plates of different woods have different vibration frequencies, and the condition of the wood as to dryness, resin or oil content, etc., also changes its frequency. Consequently, the making of an acceptable wood caller becomes a hit and miss operation, and once an acceptable caller has been made, duplication is difficult because of the several variable factors contributing to the result.

SUMMARY OF THE INVENTION

The present invention comprises a turkey caller having a sound box of wood and a sounding board of graphite impregnated with epoxy resin.

It is an object of the invention to provide a novel and improved turkey caller for producing a call closely simulating that of the natural wild turkey in tone and pitch.

Another object is to provide an improved turkey caller which produces a sound of uniformly constant quality over substantial periods of use.

A further object is to provide an improved caller which can be easily duplicated to produce calls of substantially the same characteristics.

A still further object is to provide an improved caller having optimum dimensions and utilizing a sounding board of graphite and epoxy resin.

These and other objects are accomplished by the parts and improvements comprising the present invention, a preferred embodiment of which is shown and described herein as representing the best known mode of carrying out the invention. Various modifications and changes in details of construction are comprehended within the scope of the appended claims.

BRIEF DESCRIPTION OF THE DRAWINGS

FIG. 1 is a perspective view of a preferred embodiment of the caller comprising the present invention;

FIG. 2 is a side elevation of the caller depicted in FIG. 1, partly broken away;

FIG. 3 is an enlarged cross-section taken substantially along line 3—3 of FIG. 2;

FIG. 4 is a longitudinal section taken substantially along line 4—4 of FIG. 3; and FIG. 5 is a bottom plan view of the caller depicted in FIG. 4, partly broken away.

PREFERRED EMBODIMENT FOR CARRYING OUT THE INVENTION

Referring to the drawing, the improved caller is preferably rectilinear and has a top wall 10, end walls 11, side walls 12 and 13, forming a resonator chamber R. The walls 10, 11, 12 and 13 are preferably of eastern cedar, but may be of other woods, such as mahogany, maple or walnut. A thin vibrator plate or sounding board 15 adhesively secured to the side and end walls forms the bottom wall of the box and encloses the chamber R. The sounding board 15 is preferably a graphite epoxy resin laminate comprising two plies of graphite about 150 grams per square meter and a very thin gauze-like layer of fiberglass scrim forming the exterior surface. The fibers in the two plies run at 90° to each other, those in the outer or bottom layer running longitudinally of the box. The thickness of the laminate 15 is about 0.017 inch plus or minus 0.002 inch. In the drawing the relative thickness of the laminate is enlarged for the sake of clarity.

The graphite fiber plies of laminate 15 are impregnated with 37% plus or minus 4% of epoxy resin. This amount of resin is needed to cure the laminate properly at approximately 100 PSI.

The dimensions of the box and the resonator chamber R are somewhat critical but not nearly as critical as prior callers made of entirely of wood because the composition and characteristics of the laminate are consistent and do not vary materially due to changes in composition or weather conditions. The thickness of the top wall 10 and side walls 12 and 13 is about ⅛ inch, and the thickness of the end walls 11 is about ¾ inches. The overall length of the box is preferably about 5 inches but this may vary from about 6 inches to 4½ inches. The overall width of the box is preferably about 1¼ inch and may vary from about 1¼ inches to ¾ inch. The overall thickness or depth of the box is preferably 1⅛ inches, and may vary from 1¼ inches to 1 inch.

A box longer than 6 inches produces sounds too deep and a box shorter than 4½ inches produces sounds too squeaky. The same applies to the depth and width. A box wider or deeper than 1¼ inches produces sounds too deep and a box less than ¾ inch wide or less than 1 inch deep produces sounds too squeaky.

Thus, the optimum dimensions of the box form a resonator chamber R about 3½ inches long by 1 inch wide by 1 inch deep. The box produces acceptable sounds within a substantial range in dimensions.

Preferably, a longitudinal notch is formed in the bottom edge of side wall 13 forming a slot 17 above the sounding board 15 and the ends of the slot are spaced inwardly about ¼ inch from end walls 11. An edging strip 18 preferably of wood longitudinally coextensive with the slot fits over and is adhesively secured to the exposed edge of the board 15 and projects transversely of the box slightly beyond side wall 13. The edging strip 18 provides a friction surface, preferably enhanced by chalk, causing the sounding board 15 to vibrate when edging strip 18 is rubbed or stroked by a striker bar 19 in the manner shown in phantom in FIG. 1. The striker bar is preferably slate, but may be other material such as wood. The slot 17 provides an exit for emitting the call sounds produced by the vibrations of the sounding board 15 when stroked by the bar 19. The depth of the slot is such as to allow clearance from the edging strip 18 when the sounding board 15 vibrates.

I have demonstrated in actual practice that a turkey caller made in accordance with the foregoing specification consistently produces over periods of use sounds closely simulating that of a wild turkey in varying weather conditions, and duplicate callers can be easily made which will produce substantially the same sounds.

I claim:

1. A game caller substantially rectilinear in shape having top, side and end walls of wood forming a box-like resonator chamber, a bottom vibrator plate of graphite-epoxy laminate material enclosing said chamber, a friction edging strip secured to one side edge of said vibrator plate and projecting laterally beyond the adjacent side wall said strip adapted to cause vibration of said vibrator plate when said strip is stroked by a striker bar, and the bottom edge of the side wall adjacent said edging strip having a slot therein above said edging strip to allow free vibration of said vibrator plate.

2. A game caller as in claim 1, wherein the edging strip is wood.

3. A game caller as in claim 2, wherein the vibrator plate is about 0.017 inch in thickness.

4. A game caller as in claim 3, wherein the vibrator plate comprises two plies having their fibers at 90° to each other impregnated with about 37% of epoxy resin.

* * * * *